United States Patent
Oe et al.

(10) Patent No.: US 12,488,591 B2
(45) Date of Patent: Dec. 2, 2025

(54) INFORMATION PROVIDING DEVICE AND INFORMATION PROVIDING METHOD

(71) Applicants: TOYOTA JIDOSHA KABUSHIKI KAISHA, Toyota (JP); NOMURA RESEARCH INSTITUTE, LTD., Tokyo (JP)

(72) Inventors: Yoshihiro Oe, Nagoya (JP); Wataru Minoura, Nagoya (JP); Masatoshi Hayashi, Nisshin (JP); Yutaro Imamura, Nagoya (JP); Fumihiro Nasu, Nagoya (JP); Yuki Tatsumoto, Seto (JP); Takehiko Hashimoto, Tokyo (JP)

(73) Assignees: TOYOTA JIDOSHA KABUSHIKI KAISHA, Toyota (JP); NOMURA RESEARCH INSTITUTE, LTD., Tokyo (JP)

( * ) Notice: Subject to any disclaimer, the term of this patent is extended or adjusted under 35 U.S.C. 154(b) by 0 days.

(21) Appl. No.: 18/672,097

(22) Filed: May 23, 2024

(65) Prior Publication Data

US 2024/0412523 A1 Dec. 12, 2024

(30) Foreign Application Priority Data

Jun. 6, 2023 (JP) ................................. 2023-093330

(51) Int. Cl.
*G06V 20/54* (2022.01)
*G06F 3/14* (2006.01)
(Continued)

(52) U.S. Cl.
CPC ................ *G06V 20/54* (2022.01); *G06F 3/14* (2013.01); *G06V 20/44* (2022.01); *G06V 20/58* (2022.01)

(58) Field of Classification Search
CPC ........ G06V 20/54; G06V 20/44; G06V 20/58; G06F 3/14; G08G 1/0962; G08G 1/0967; G07C 5/0866
(Continued)

(56) References Cited

U.S. PATENT DOCUMENTS 6,466,862 B1 * 10/2002 DeKock ........... H04N 21/23406
340/901
10,807,592 B2 * 10/2020 Golov .................. G06V 20/584
(Continued)

FOREIGN PATENT DOCUMENTS

JP 2017-173299 A 9/2017

*Primary Examiner* — John W Miller
*Assistant Examiner* — Omer Khalid
(74) *Attorney, Agent, or Firm* — Oblon, McClelland, Maier & Neustadt, L.L.P.

(57) ABSTRACT

An information providing device and an information providing method are provided. Processing circuitry receives, from a first vehicle, a piece of video data related to the moment the first vehicle passed an occurrence site. The first vehicle captures a piece of video data by a dashboard camera when passing the occurrence site of a traffic event requiring cautious driving. The processing circuitry extracts a piece of image data representing a situation of the occurrence site from the video related to the piece of video data, and transmits the piece of image data to the second vehicle. When the second vehicle reaches a notification location, a display device of the second vehicle displays an image related to the piece of image data in order to issue an alert.

5 Claims, 4 Drawing Sheets

(51) Int. Cl.
*G06V 20/40* (2022.01)
*G06V 20/58* (2022.01)

(58) Field of Classification Search
USPC .......................................................... 348/148
See application file for complete search history.

(56) References Cited

U.S. PATENT DOCUMENTS

| | | | |
|---|---|---|---|
| 10,916,132 B2* | 2/2021 | Arshad | G01C 21/3415 |
| 2008/0137908 A1* | 6/2008 | Stein | G08G 1/096783 |
| | | | 382/103 |
| 2016/0330394 A1* | 11/2016 | Shahraray | H04W 4/021 |
| 2017/0276504 A1 | 9/2017 | Lu et al. | |

* cited by examiner

INFORMATION PROVIDING DEVICE AND INFORMATION PROVIDING METHOD

CROSS-REFERENCE TO RELATED APPLICATIONS

This application is based upon and claims the benefit of priority from prior Japanese Patent Application No. 2023-093330, filed on Jun. 6, 2023, the entire contents of which are incorporated herein by reference.

BACKGROUND

1. Field

The present disclosure relates to an information providing device and an information providing method.

2. Description of Related Art

Japanese Laid-Open Patent Publication No. 2017-173299 discloses a vehicle traffic assistance method. Traffic management decisions made by road authorities impact driving of vehicles. The vehicle traffic assistance method provides drivers with information on traffic management decisions made by the road authorities.

The vehicle traffic assistance method further provides the driver with information on a traveling route to a destination, taking into consideration the traffic management decisions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an information providing device is provided. The information providing device includes processing circuitry and storage circuitry connected to multiple vehicles via a communication network. The multiple vehicles include a first vehicle and a second vehicle. The processing circuitry of the information providing device receives, from the first vehicle, a piece of captured video data related to the moment the first vehicle passed an occurrence site. The first vehicle includes a dashboard camera. The first vehicle captures the piece of video data by the dashboard camera when passing the occurrence site of a traffic event requiring cautious driving. The processing circuitry extracts a piece of image data representing a situation of the occurrence site from the video related to the piece of video data. The processing circuitry stores the extracted piece of image data in the storage circuitry. The processing circuitry transmits the image data stored in the storage circuitry to the second vehicle. The second vehicle includes a display device. There is a possibility that the second vehicle will pass the occurrence site after the first vehicle does. When the second vehicle reaches a notification location, the display device displays an image related to the piece of image data in order to issue an alert. The notification location is located before the occurrence site.

In another general aspect, an information providing method is provided. The information providing method is performed by an information providing device. The information providing device is connected to multiple vehicles via a communication network. The multiple vehicles include a first vehicle and a second vehicle. The information providing method includes, by using processing circuitry of the information providing device, receiving, from the first vehicle, a piece of captured video data related to the moment the first vehicle passed an occurrence site. The first vehicle includes a dashboard camera. The first vehicle captures the piece of video data by the dashboard camera when passing the occurrence site of a traffic event requiring cautious driving. The information providing method includes extracting a piece of image data representing a situation of the occurrence site from the video related to the piece of video data, and storing the extracted image data in storage circuitry of the information providing device. The information providing method transmits the image data stored in the storage circuitry to the second vehicle. The second vehicle includes a display device. There is a possibility that the second vehicle will pass the occurrence site after the first vehicle does. When the second vehicle reaches a notification location, the display device of the second vehicle displays an image related to the image data in order to issue an alert. The notification location is located before the occurrence site.

The information providing device and the information providing method notify the driver of the second vehicle of the situation of the occurrence site of a traffic event by an image. Therefore, it is possible to issue an alert effectively.

A case will now be considered in which a traffic event, such as an accident or construction, which requires cautious driving, has occurred on a traveling route. The vehicle traffic assistance method may notify the driver of information on the traffic event by displaying an icon or character information on a display device in the vehicle. However, it may be difficult for the driver to know the detailed situation of the site only by viewing the icon or the character information. The device and method described above improve such a situation.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An information providing device 200, an information providing method, and an information providing process according to one embodiment will now be described with reference to FIGS. 1 to 6.

Configuration of Information Providing System 10

Figure 1:
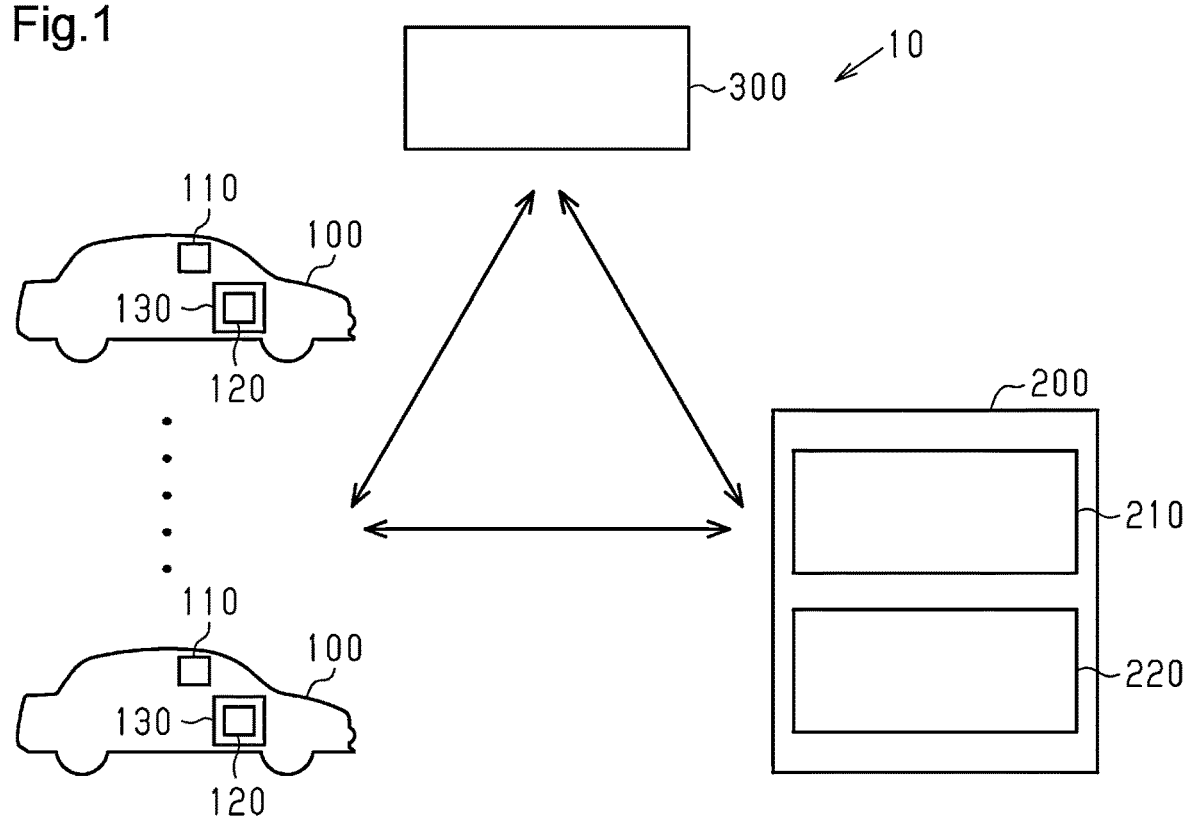
FIG. 1 is a schematic diagram showing a configuration of an information providing system including an information providing device according to an embodiment.

As shown in FIG. 1, the information providing system 10 includes multiple vehicles 100, the information providing device 200, and a traffic information center 300. The information providing device 200, the traffic information center 300, and the vehicles 100 are connected to each other via a wireless communication network so as to exchange information with each other.

Each vehicle 100 includes a dashboard camera 110, a display device 120, and a car navigation device 130.

The dashboard camera 110 captures and records video of the area in front of the vehicle as seen from the driver's seat.

The display device 120 displays information to the driver of the vehicle 100. The display device 120 is, for example, a display of the car navigation device 130 as illustrated in FIG. 1. The display device 120 may be, for example, a head-up display that displays information by projecting the information on the windshield of the vehicle 100. The display device 120 may be, for example, an information display mounted on the meter panel of the vehicle 100.

The car navigation device 130 includes a receiver of a satellite positioning system, a storage device that stores data such as map information, and a communication device.

The car navigation device 130 is connected to the dashboard camera 110 so as to exchange information with the dashboard camera 110. The car navigation device 130 transmits pieces of video data captured by the dashboard camera 110 to the information providing device 200. The car navigation device 130 causes the display device 120 to display the information received from the information providing device 200.

The information providing device 200 includes a storage device 220, in which programs are stored, and a processing device 210, which executes various processes by executing the programs stored in the storage device 220. The processing device 210 includes a processor. The processing device 210 may be processing circuitry. The information providing device 200 may include an information providing circuit.

The information providing device 200 may be include multiple computers. For example, the information providing device 200 may include multiple server devices.

The traffic information center 300 collects information about road traffic situations from information providers observing traffic situations, such as the police and road managers. The traffic information center 300 organizes and edits the collected information. The traffic information center 300 provides the edited information to each vehicle 100 and the information providing device 200.

The information providing system 10 issues an alert when a vehicle 100 is about to pass the occurrence site of a traffic event that requires cautious driving, such as construction on the road. An alert is issued, for example, by displaying an icon indicating the type of a traffic event on the display device 120 of the vehicle 100.

Traffic events may be one or any of an accident, an obstacle, construction, and a lane restriction. The information on traffic events is transmitted to the vehicles 100 and the information providing device 200 from the traffic information center 300, which transmits road traffic information. The information of traffic events provided by the traffic information center 300 includes, for example, the type of a traffic event that is occurring and location information of the occurrence site of the traffic event. An icon indicating the traffic event is displayed by the display device 120 based on the information received from the traffic information center 300.

In the context of traffic events, accidents encompass not only situations where traffic accidents occur, such as collisions between vehicles or between vehicles and pedestrians, but also the state in which post-accident procedures are being carried out. Obstacles include objects that cause obstruction to the road traffic of the vehicles 100, such as objects fallen from a vehicle preceding a vehicle 100 or fallen trees, that are present on or around the road. Construction includes activities conducted on the road, such as paving work or maintenance work on water pipes on the road. Lane restrictions include situations where certain lanes are closed to traffic of the vehicles 100 due to construction or similar events, while directing traffic to use other lanes.

Transmission and Reception of Pieces of Video Data and Pieces of Image Data in Information Providing System 10

Next, transmission and reception of pieces of video data and pieces of image data between the information providing device 200 and vehicles (a first vehicle 101 and a second vehicle 102) will be described with reference to FIG. 2. The first vehicle 101 represents one or more vehicles that have passed the occurrence site of a traffic event, among the multiple vehicles 100. The second vehicle 102 represents one or more vehicles that may pass the occurrence site after the first vehicle 101, among the multiple vehicles 100. A piece of video data is captured by the dashboard camera 110 of the first vehicle 101 while the first vehicle 101 is passing the occurrence site. A piece of image data is extracted from the video related to the piece of video data captured by the dashboard camera 110 while the first vehicle 101 is passing the occurrence site.

Figure 2:
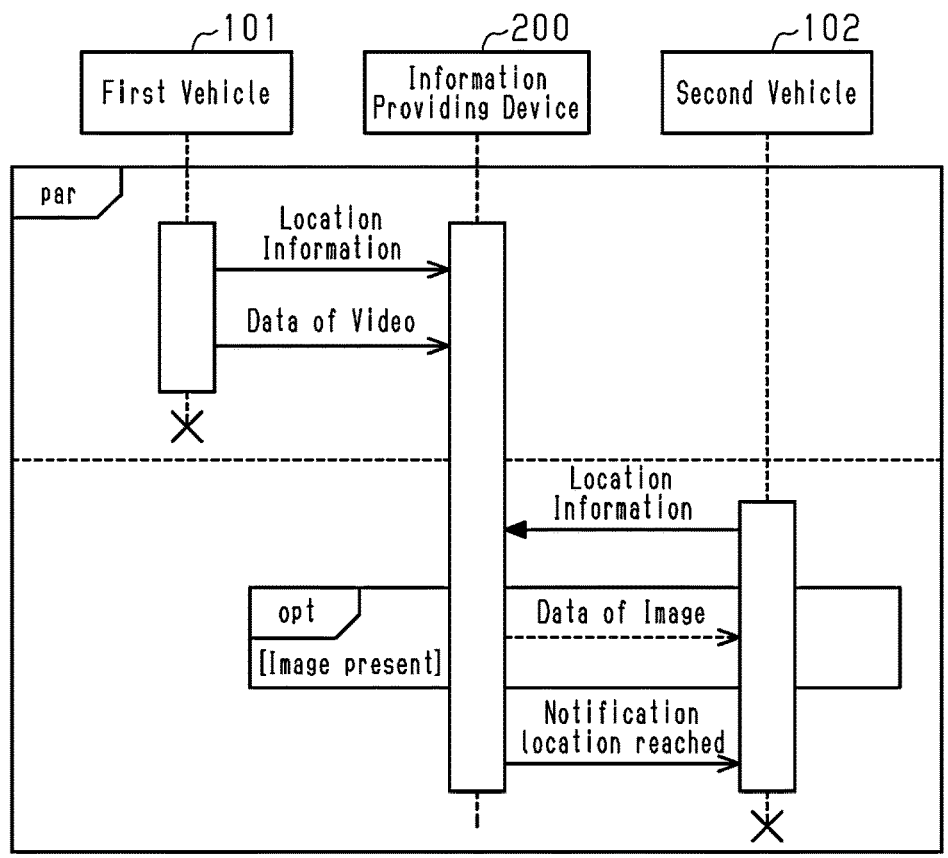
FIG. 2 is a sequence diagram illustrating a flow of processes of the information providing device, a first vehicle, and a second vehicle in the information providing system according to the embodiment shown in FIG. 1.

As shown in FIG. 2, a process in which the information providing device 200 receives the piece of video data from the first vehicle 101 and a process in which the information providing device 200 provides the piece of image data to the second vehicle 102 can be performed in parallel.

As shown in the upper part of FIG. 2, that is, the part above the horizontally extending broken line, the first vehicle 101 continues to transmit the location information of the first vehicle 101 to the information providing device 200 while traveling. This allows the information providing device 200 to obtain the traveling position of the first vehicle 101.

As illustrated in the upper part of FIG. 2, in the information providing system 10, the information providing device 200 receives the piece of video data from the first vehicle 101, which has passed the occurrence site of the traffic event. The information providing device 200, which has received the piece of video data, extracts an image from the received piece of video data and stores the extracted image in the storage device 220.

As shown in the lower part of FIG. 2, that is, the part below the horizontally extending broken line, the second vehicle 102 continues to transmit the location information of the second vehicle 102 to the information providing device 200 while continuing to travel, similarly to the first vehicle 101 in the upper part of FIG. 2. The information providing device 200 detects that the second vehicle 102 has reached a notification location based on the location information of the second vehicle 102. The notification location is located before the occurrence site of the traffic event. Specifically, the notification location is a point on the traveling route of a vehicle 100 where, if there is an occurrence of a traffic event ahead, it is positioned before the vehicle 100 reaches the site of the traffic event. In other words, the notification location is a point at which the driver of the vehicle 100 is notified of the presence of the traffic event so that the driver is alerted before the vehicle 100 reaches the occurrence site of the traffic event. The information providing device 200 pre-sets a point before the occurrence site of the traffic event as a notification location based on information from the traffic information center 300. The information providing device 200 recognizes the vehicle 100 that has reached the notification location as the vehicle 100 that has the potential to pass the occurrence site of the traffic event in the future, that is, as the second vehicle 102.

In a case in which a piece of image data to be transmitted to the second vehicle 102 has been stored in the storage device 220, the information providing device 200 transmits the piece of image data to the second vehicle 102 when detecting that the second vehicle 102 has reached the notification location, as shown in the lower part of FIG. 2 At this time, the piece of image data to be transmitted to the second vehicle 102 is a piece of image data of the traffic event corresponding to the notification location reached by the second vehicle 102. Thereafter, regardless of the presence or absence of the piece of image data, the information providing device 200 transmits, to the second vehicle 102, a reaching signal indicating that the second vehicle 102 has reached the notification location.

Figure 3:
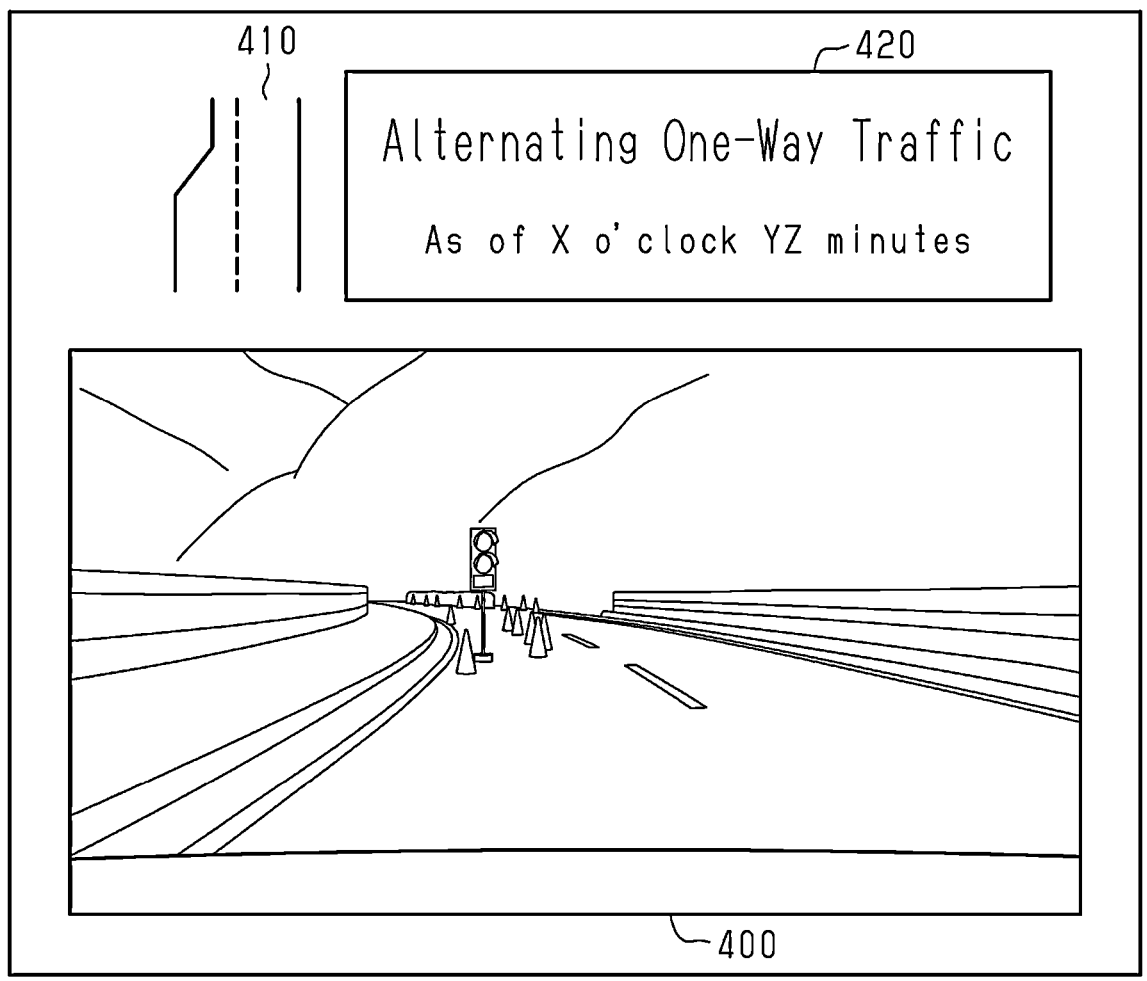
FIG. 3 is a diagram showing an example of a display by a display device in the second vehicle shown in FIG. 2 in the information providing system according to the embodiment.

After receiving the reaching signal indicating that the second vehicle 102 has reached the notification location, the second vehicle 102 performs the following operation in a case in which the piece of image data has been received from the information providing device 200. Specifically, the vehicle 102 displays an approach notification indicating the approach of the second vehicle 102 to the occurrence site of the traffic event on the display device 120 in a first display mode. Thus, the driver of the second vehicle 102 is alerted. As illustrated in FIG. 3, the first display mode includes an image (400) indicating the situation of the occurrence site of the traffic event, an icon (410) indicating the type of the traffic event, character information (420) indicating the time at which the image was captured, and character information (420) indicating additional information about the traffic event, which will be discussed below. The icon (410) indicating the traffic event is displayed based on information that has been received by the second vehicle 102 from the traffic information center 300. The second vehicle 102 has already received the image (400) indicating the situation of the occurrence site of the traffic event, the time (420) at which the image was captured, and additional information (420) on the traffic event, from the information providing device 200.

FIG. 3 shows an example of a display in the first display mode displayed on the display device 120. As shown in FIG. 3, the display in the first display mode includes a received image 400, an icon 410, and a character information display field 420. The received image 400 relates to a piece of image data representing the situation of the occurrence site of the traffic event, which has been received from the information providing device 200. The icon 410 indicates the type of the traffic event. The character information display field 420 displays character information indicating the time at which the image of the received image 400 was captured, and character information indicating additional information about the traffic event. Such a display mode allows the driver of the second vehicle 102 to recognize the presence of the traffic event on the traveling route together with the actual situation of the occurrence site of the traffic event.

The reaching signal indicates that the second vehicle 102 has reached the notification location. In a case in which the second vehicle 102, which has received the reaching signal, has not received the piece of image data from the information providing device 200, the driver of the second vehicle 102 is alerted in the following manner. The display device 120 of the second vehicle 102 displays the approach notification in a second display mode. The approach notification indicates that the second vehicle 102 is approaching the occurrence site of the traffic event. The second display mode includes an icon indicating the type of the traffic event. That is, the second display mode includes only the icon 410 in FIG. 3. The second display mode does not include the received image 400.

Hereinafter, with reference to FIGS. 4 to 6, the flow of a process executed in the vehicle 100 and the flow of a process executed in the information providing device 200 in order to implement the above-described alert using an image will be described more specifically.

Process Executed by Car Navigation Device 130 of Vehicle 100

Figure 4:
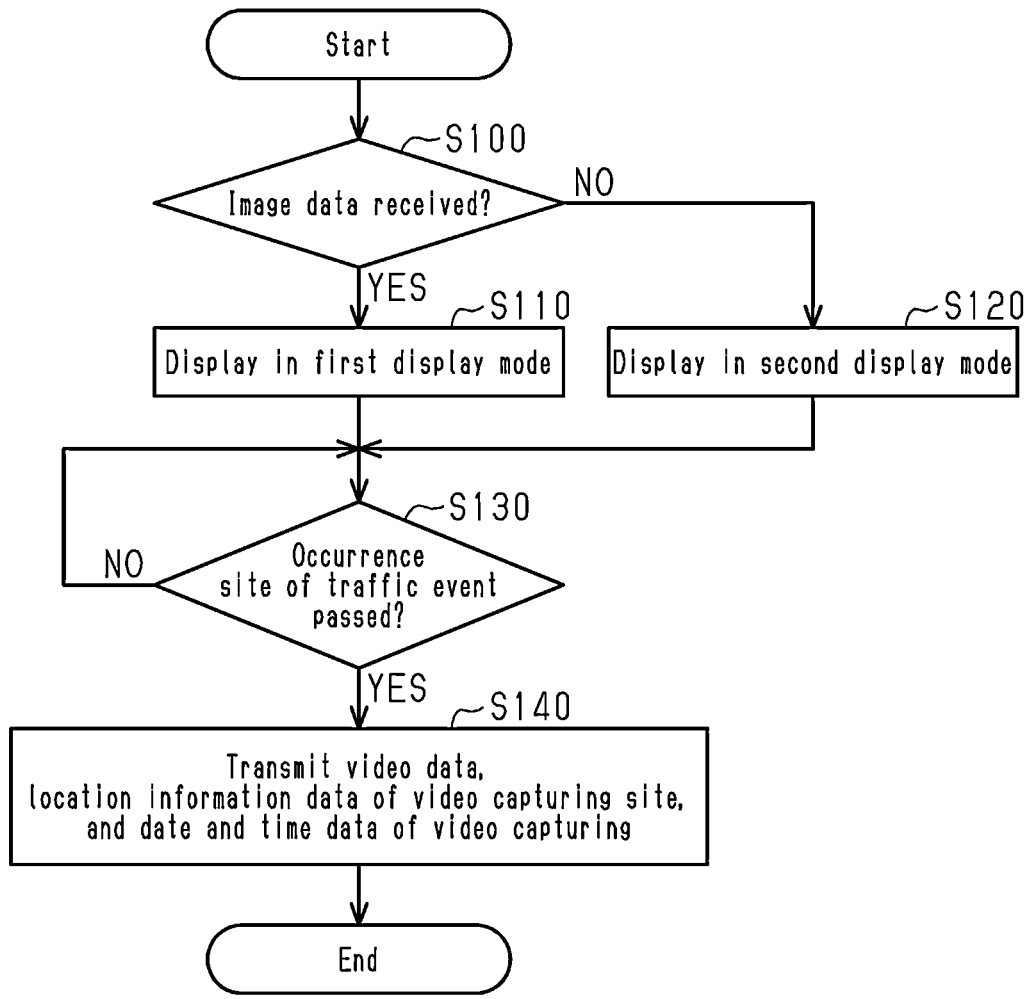
FIG. 4 is a flowchart showing a flow of processes executed by car navigation devices in the first vehicle and the second vehicle shown in FIG. 2 in the information providing system according to the embodiment.

FIG. 4 shows the flow of a series of processes executed in the vehicle 100. The series of processes is executed by the car navigation device 130 of the vehicle 100. This series of processes is executed when the car navigation device 130 receives a reaching signal from the information providing device 200. The reaching signal indicates that the vehicle 100 has reached the notification location.

As shown in FIG. 4, when the series of processes is started, the car navigation device 130 determines in step S100 whether a piece of image data has been received from the information providing device 200. In the process of step S100, when it is determined that the car navigation device 130 has received a piece of image data (S100: YES), the process proceeds to step S110. The piece of image data received by the car navigation device 130 is a piece of image data extracted from a piece of video data provided by the first vehicle 101. The first vehicle 101 has passed the occurrence site of a corresponding traffic event. That is, the occurrence site of the corresponding traffic event corresponds to the notification location reached by which the vehicle 100 including the car navigation device 130.

In the process of step S110, the car navigation device 130 displays the approach notification on the display device 120 in the first display mode described above with reference to FIG. 3. The approach notification indicates the approach to the occurrence site of the traffic event. The alert is thus issued. When the alert is issued by the display in the first display mode, the process proceeds to step S130. In this case, the vehicle 100 is acting as the second vehicle 102.

In contrast, when it is determined that the car navigation device 130 failed to receive the piece of image data in step S100 (step S100: NO), the process proceeds to step S120. In the process of step S120, the car navigation device 130 displays the approach notification indicating the approach of the vehicle 100 to the occurrence site of the traffic event on the display device 120 in the second display mode to issue an alert. When the alert is issued by the display in the second display mode, the process proceeds to step S130.

In the process of step S130, the car navigation device 130 determines whether the vehicle 100 has passed the occurrence site of the traffic event. At this time, the car navigation device 130 determines whether the vehicle 100 has passed the occurrence site by using the location information of the vehicle 100 and the location information of the occurrence site of the traffic event received from the traffic information center 300.

In the process of step S130, when it is determined that the vehicle 100 including the car navigation device 130 has not passed the occurrence site of the traffic event (step S130: NO), the process of step S130 is repeated. In the process of step S130, when it is determined that the vehicle 100 including the car navigation device 130 has passed the occurrence site of the traffic event (step S130: YES), the process proceeds to step S140.

In the process of step S140, the car navigation device 130 transmits the piece of video data, the location information data of the video capturing site, and the date and time data of the video capturing to the information providing device 200. The piece of video data to be transmitted is a piece of video data captured by the dashboard camera 110 while the vehicle 100 is passing the occurrence site of the traffic event. In this case, the vehicle 100 is acting as the first vehicle 101.

Thus, the car navigation device 130 terminates the series of processes after transmitting the piece of video data, the location information of the video capturing site, and the date and time data of the video capturing to the information providing device 200 through the process in step S140.

The processes of steps S100 to S120 correspond to the processes performed by the second vehicle 102 shown in the lower part of FIG. 2. The processes of step S130 and step S140 correspond to the processes performed by the first vehicle 101 shown in the upper part of FIG. 2. A vehicle 100 can act as the first vehicle 101, which provides a piece of video data, or as the second vehicle 102, which receives a piece of image data, depending on the situation.

Figure 5:
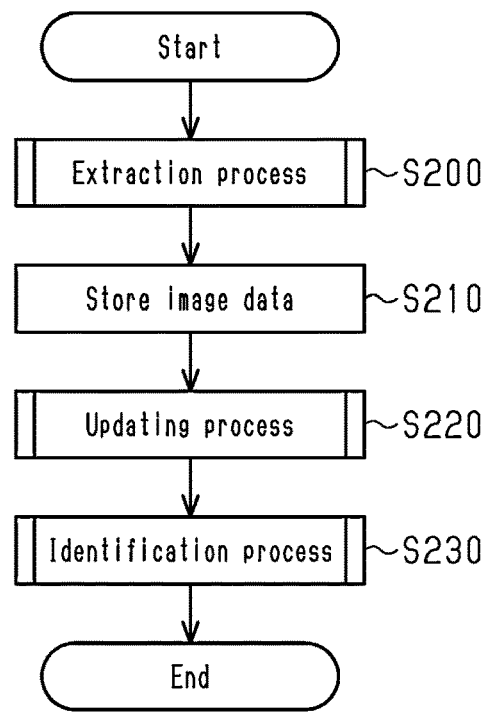
FIG. 5 is a flowchart showing a flow of processes related to collection of images executed by the information providing device shown in FIG. 2 in the information providing system according to the embodiment.

Process Executed by Information Providing Device 200 Upon Reception of Video Data FIG. 5 shows the flow of a series of processes executed by the information providing device 200 when receiving a piece of video data. This series of processes is executed by the processing device 210 of the information providing device 200. This series of processes corresponds to a process executed by the information providing device 200 when the information providing device 200 receives a piece of video data from the first vehicle 101 as illustrated in the upper part of FIG. 2.

As shown in FIG. 5, when starting this series of processes, the processing device 210 first performs an extraction process in the process of step S200. In the extraction process, an image to be transmitted to the second vehicle 102 is extracted from the video related to the piece of video data received from the first vehicle 101. The image extracted during the extraction process preferably depicts a scene in the video that clearly represents the situation at the occurrence site of a traffic event. Therefore, for example, the processing device 210 extracts an image in the video that best displays the situation on the road or an image with minimal obstructions such as other vehicles. The image extracted in the extraction process is preferably clear enough so that signs on the road can be readily identified. Hence, for example, the processing device 210 extracts, as the image, a scene in which the characters on signs are clearly recognizable.

For example, the extraction process may be a process in which the processing device 210 displays the video received from a vehicle 100 to an operator and allows the operator to extract an image. The extraction process may be a process in which the processing device 210 extracts an image by recognizing an object appearing in the video received from a vehicle 100 through an image recognition process. In this case, the processing device 210 extracts an image that satisfies a predetermined condition, such as whether characters on a signboard can be clearly read. After the extraction process is executed, the processing device 210 stores the extracted piece of image data in the storage device 220 in the next step S210.

In the process of the next step S220, the processing device 210 executes an updating process. The updating process evaluates a newly stored piece of image data and updates the piece of image data to be provided to the second vehicle 102. The processing device 210 compares the piece of image data already stored in the storage device 220 as the piece of image data to be provided to the second vehicle 102 with the newly extracted piece of image data. The processing device 210 updates the piece of image data to be provided to the second vehicle 102 according to the comparison result. The processing device 210 preferably selects a piece of image data that clearly depicts the situation at the occurrence site of the traffic event as the piece of image data to be provided to the second vehicle 102. Therefore, for example, the processing device 210 selects, as the piece of image data to be provided to the second vehicle 102, a piece of image data that clearly displays the situation on the road or a piece of image data with fewer obstructions such as other vehicles. The processing device 210 preferably selects the newest possible piece of image data. Hence, for example, the processing device 210 selects the newest possible data as the piece of image data to be provided to the second vehicle 102.

The updating process may be executed after multiple pieces of image data representing multiple images of the occurrence site of the same traffic event have been accumulated in the storage device 220. In this case, the processing device 210 selects one piece of image data from the multiple pieces of image data for the occurrence site of the same traffic event. Further, the processing device 210 updates the piece of image data to be transmitted to the second vehicle 102 with the selected piece of image data. For example, the updating process may be a process in which the processing device 210 displays images accumulated in the storage device 220 to the operator and allows the operator to select one image. The updating process may be a process in which the processing device 210 evaluates each of the accumulated images based on the brightness or contrast of the image, and selects an image to which the highest level of evaluation has been given. The updating process may further be a process in which information on the order in which the clips of video have been transmitted to the processing device 210 is reflected. For example, the updating process may be a process in which, when there are multiple images to which the same level of evaluation has been given, the processing device 210 selects a newer image from among those images. The selected piece of image data that has undergone the updating process is stored in the storage device 220.

When the piece of image data to be transmitted to the second vehicle 102 is stored in the storage device 220 by executing the updating process of step S220, the process proceeds to step S230. In the process of step S230, the processing device 210 performs an identification process. The identification process identifies information related to the traffic event from the piece of image data selected in the updating process.

The information related to the traffic event includes, for example, the type of regulation at the occurrence site of the traffic event, the weather conditions, and the degree of congestion. The type of regulation refers to the form of traffic control on the road, such as alternating one-way traffic or two-way traffic in the context of lane restrictions. The processing device 210 stores the identified information in the storage device 220 as additional information related to the traffic event.

When completing the process of step S230, the processing device 210 of the information providing device 200 finishes this series of processes.

Figure 6:
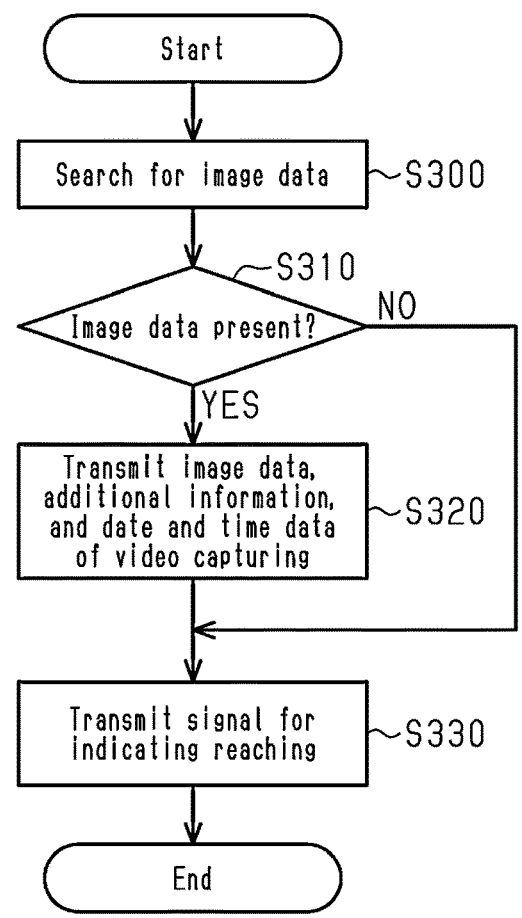
FIG. 6 is a flowchart showing a flow of processes related to transmission of an image executed by the information providing device shown in FIG. 2 in the information providing system according to the embodiment.

Process Executed by Information Providing Device 200 Upon Detection of Notification Location Reached FIG. 6 shows a series of processes executed by the information providing device 200 when the information providing device 200 detects that the second vehicle 102 has reached the notification location. This series of processes is executed by the processing device 210 of the information providing device 200. The series of processes in FIG. 6 is executed by the information providing device 200 when the information providing device 200 detects that the second vehicle 102 has reached the notification location. The series of processes in FIG. 6 is executed by the information providing device 200 as the part shown in the lower part of FIG. 2.

When starting the series of processes shown in FIG. 6, the processing device 210 first searches for, in the process of step S300, a piece of image data to be provided to the second vehicle 102 from among the multiple pieces of image data already stored in the storage device 220. Specifically, the processing device 210 searches for the piece of image data to be provided by matching the location information of the site of the traffic event corresponding to the notification point already reached by the second vehicle 102 with the location information data of the capturing site of each image.

In the process of the next step S310, the processing device 210 determines whether there is a piece of image data to be provided to the second vehicle 102. Specifically, the processing device 210 determines whether the storage device 220 has already stored the piece of image data obtained by capturing an image of the occurrence site of the traffic event corresponding to the notification location already reached by the second vehicle 102. When the relevant piece of image data is not stored in the storage device 220, the processing device 210 determines that there is no piece of image data to be provided to the second vehicle 102. When the relevant piece of image data has already been stored in the storage device 220, the processing device 210 determines that there is a piece of image data to be provided to the second vehicle 102.

In the process of step S310, when it is determined that there is a piece of image data to be provided to the second vehicle 102 (S310: YES), the process proceeds to step S320. In the process of step S320, the processing device 210 transmits, to the second vehicle 102, the relevant piece of image data, the additional information identified in step S230 of FIG. 5, and the data of the date and time at which the video was captured. When the piece of image data, the additional information, and the data of the date and time at which the video was captured are transmitted from the processing device 210, the process proceeds to the next step S330.

In the process of step S310, when it is determined that there is no piece of image data to be provided to the second vehicle 102 (step S310: NO), the process proceeds to step S330. That is, if the piece of image data after the search is not stored in the storage device 220, the processing device 210 does not transmit the piece of image data, the additional information, or the data of the date and time at which the video was captured, and advances the process to step S330.

In the process of the next step S330, the processing device 210 transmits the reaching signal indicating that the second vehicle 102 has reached the notification location to the second vehicle 102. After transmitting the signal, the processing device 210 ends the series of processes.

Operation of Present Embodiment

The processing device 210 receives the piece of video data captured by the dashboard camera 110 from the first vehicle 101 through the series of processes described with reference to FIG. 5. The processing device 210 extracts a piece of image data from the video related to the received piece of video data, and stores the extracted piece of image data in the storage device 220. The series of processes described with reference to FIG. 5 is a first step in the information providing method performed by the information providing device 200.

The processing device 210 transmits the piece of image data stored in the storage device 220 to the second vehicle 102 through the processes of steps S300 to S320 in the series of processes described with reference to FIG. 6. The display device 120 of the second vehicle 102 displays an image related to the image data. As a result, the information providing device 200 alerts the driver of the second vehicle 102. This series of processes is a second step in the information providing method by the information providing device 200.

The information providing device 200 executes the information providing method, which includes the first step and the second step. The information providing device 200 executes the information providing method to display the image related to the image data captured by the dashboard camera 110 of the first vehicle 101, thereby alerting the driver of the second vehicle 102 on the traveling route where the occurrence site of the traffic event is present.

Advantages of Present Embodiment (1) The information providing device 200 operates to display the image captured by the dashboard camera 110 of the first vehicle 101 on the display device 120 of the second vehicle 102 before the second vehicle 102 reaches the occurrence site of the traffic event. The first vehicle 101 has actually passed the occurrence site of the traffic event. Accordingly, the information providing device 200 notifies the driver of the second vehicle 102 of the situation of the occurrence site of the traffic event through the image depicting the situation of the occurrence site. This allows the information providing device 200 to perform an effective alert.

(2) The processing device 210 of the information providing device 200 identifies the situation of the occurrence site of the traffic event from an image. The processing device 210 transmits the identification result as additional information to the second vehicle 102 together with the image. The processing device 210 operates to cause the display device 120 of the second vehicle 102 to display character information indicating the situation of the occurrence site together with the image. Accordingly, the information providing device 200 converts information obtained by recognizing the piece of image data from the first vehicle 101 into character information, and causes the display device 120 of the second vehicle 102 to display the character information together with the image. This allows the information providing device 200 to more reliably notify the driver of the second vehicle 102 of the situation of the occurrence site, for example, as compared to a case in which only the image is displayed.

(3) The processing device 210 of the information providing device 200 accumulates, in the storage device 220, multiple pieces of image data that have been extracted from multiple clips of video of the same site that have been received from multiple first vehicles 101. The processing device 210 selects an image to be transmitted to the second vehicle 102 from among the multiple pieces of image data for the same site accumulated in the storage device 220, and updates the image to be transmitted to the second vehicle 102. Accordingly, the image to be transmitted to the second vehicle 102 is updated by being selected from the multiple pieces of image data for the same site accumulated in the storage device 220 of the information providing device 200. The information providing device 200 therefore can provide a more appropriate image to the driver of the second vehicle 102.

(4) In the above-described information providing method, the image captured by the dashboard camera 110 of the first vehicle 101 is displayed on the display device 120 of the second vehicle 102 before the occurrence site of the traffic event is reached. The first vehicle 101 has actually passed the occurrence site of the traffic event. Therefore, in the above-described information providing method, the driver of the second vehicle 102 is notified of the detailed situation of the occurrence site of the traffic event by the image based on the reality. Therefore, it is possible to issue an alert effectively.

Modifications

The above-described embodiment may be modified as follows. The above-described embodiment and the following modifications can be combined as long as the combined modifications remain technically consistent with each other.

In the information providing system 10 described above, each vehicle 100 may act as the first vehicle 101 or the second vehicle 102, as described with reference to FIG. 4. However, the multiple vehicles 100 may include vehicles that only receive images. That is, there may be vehicles that act only as the second vehicles 102. In this case, vehicles that only receive images do not need to be equipped with a dashboard camera 110. Vehicles that only receive images may execute only the processes from step S100 to step S120 described with reference to FIG. 4.

The multiple vehicles 100 may include vehicles that only transmit video. That is, there may be vehicles that act only as the first vehicles 101. In this case, vehicles that only transmit or provide captured video do not necessarily need to include the display device 120. Vehicles that only provide video may execute only the processes step S130 and step S140 described with reference to FIG. 4.

In the information providing system 10 described above, the car navigation device 130 communicates with the information providing device 200. The car navigation device 130 includes a receiver of a satellite positioning system. The car navigation device 130 executes processes related to display of images and transmission of pieces of video data. The processes related to the communication, the positioning, and the display of images, and the processes related to transmission of pieces of video data do not necessarily need to be performed by the car navigation device 130. For example, the information providing device 200 may be installed in a vehicle 100 in which the receiver of a satellite positioning system is provided in a portion of the vehicle 100 other than the car navigation device 130. The vehicle 100 may be of any type if it includes a communication device that communicates with the information providing device 200. The vehicle 100 may be of any type if it includes a processing device that performs a process related to display of images and a process related to transmission of pieces of video data. For example, the dashboard camera 110 includes the display device 120, a receiver of a satellite positioning system, and a communication device. The dashboard camera 110 further includes a processing device that performs a process related to display of images and a process related to transmission of pieces of video data. The vehicle 100 may be equipped with such a dashboard camera 110. In this case, the functions related to the approach notification for indicating the approach of the vehicle 100 to the occurrence site of a traffic event is consolidated within the dashboard camera 110.

In the above-described information providing system 10, the display mode on the display device 120 of the second vehicle 102 is not required to include icons, character information indicating the time the image was captured, or character information indicating additional information. In other words, the display mode on the display device 120 in the second vehicle 102 only needs to include images related to the piece of image data that has been received in the first display mode. Any of the above components, such as icons or character information other than the received image, can be omitted. If the display device 120 does not display character information indicating the time the image was captured, neither the vehicle 100 nor the information providing device 200 are required to perform the step of transmitting the data of the data of the date and time at which the video was captured.

In the above-described information providing system 10, as shown in the lower part of FIG. 2, the information providing device 200 transmits the piece of image data to the second vehicle 102 after the information providing device 200 detects the reaching of the second vehicle 102 at the notification location. The transmitted piece of image data is displayed on the second vehicle 102. However, the information providing device 200 may transmit the piece of image data to all the vehicles 100 traveling at sites within a first distance from the occurrence site of the traffic event. The first distance is longer than the distance between the occurrence site of the traffic event and the notification location. In this case, among the vehicles 100 that have received the piece of image data, the second vehicle 102 that has reached the notification location spontaneously detects the reaching of the second vehicle 102 at the notification location, thereby displaying an image related to the piece of image data on the display device 120. In this manner, the information providing device 200 may transmit the piece of image data to the second vehicle 102 before the second vehicle 102 reaches the notification location, that is, in advance. Even in this case, when the second vehicle 102 reaches the notification location, it is possible to cause the display device 120 to display the image related to the piece of image data.

The information providing device 200 may be modified if it includes a CPU and a ROM and executes software processing. The information providing device 200 is not limited to this configuration. That is, the information providing device 200 may be modified if it has any one of the following configurations (a) to (c).

(a) The information providing device 200 includes one or more processors that execute various processes according to computer programs. The processor includes a CPU and a memory such as RAM and ROM. The memory stores program code or instructions configured to cause the CPU to execute processes, for example, an information providing process. The memory, which is a non-transitory computer-readable storage medium, includes any type of media that are accessible by general-purpose computers and dedicated computers.
  (b) The information providing device 200 includes one or more dedicated hardware circuits that execute various processes. The dedicated hardware circuits include, for example, an application specific integrated circuit (ASIC) and a field programmable gate array (FPGA).
  (c) The information providing device 200 includes a processor that executes part of various processes according to programs and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An information providing device, comprising:
    storage circuitry connected to multiple vehicles via a communication network; and
    processing circuitry, wherein
    the multiple vehicles include a first vehicle and a second vehicle, and
    the processing circuitry is configured to:
        receive a piece of video data from the first vehicle, the first vehicle including a dashboard camera, the piece of video data having been captured by the dashboard camera when the first vehicle passed a location corresponding to an occurrence site of a traffic event requiring cautious driving, the occurrence site being identified based on traffic event information received from a traffic information center;
        extract a piece of image data depicting a situation at the occurrence site from the piece of video data;
        store the extracted piece of image data in the storage circuitry;
        transmit the piece of image data stored in the storage circuitry to the second vehicle, the second vehicle including a display device, wherein there is a possibility that the second vehicle will pass the occurrence site after the first vehicle does, and the display device displays an image related to the piece of image data when the second vehicle reaches a predetermined notification location located a specified distance before the occurrence site in order to issue an alert;
        receive traffic event information, including a type and a location of a traffic event, from the traffic information center;
        correlate the received piece of video data with the location of the traffic event; and
        when extracting the piece of image data, select an image frame from the video data that both corresponds to the location of the traffic event and satisfies at least one image quality condition, the image quality condition including a degree of visibility of a road sign, an obstacle, or a construction indicator in the image frame.

2. The information providing device according to claim 1, wherein
    the traffic event includes at least one of an accident, an obstacle, a construction, and a lane restriction, and
    the traffic information center for transmitting road traffic information transmits information on the traffic event to the multiple vehicles and the information providing device.

3. The information providing device according to claim 1, wherein the processing circuitry is further configured to:
    identify the situation of the occurrence site from the image related to the piece of image data; and
    transmit, together with the image, an identified result as additional information to the display device of the second vehicle in order to cause the display device of the second vehicle to display character information indicating the situation of the occurrence site.

4. The information providing device according to claim 1, wherein
    the first vehicle is one of multiple first vehicles, and
    the processing circuitry is further configured to:
        receive multiple pieces of video data related to the same point from the multiple first vehicles;
        extract multiple pieces of image data from the received pieces of video data;
        accumulate the extracted pieces of image data in the storage circuitry; and
        select and update an image to be transmitted to the second vehicle from among the accumulated pieces of image data related to the same point.

5. An information providing method performed by an information providing device, wherein
    the information providing device is connected to multiple vehicles via a communication network, the multiple vehicles include a first vehicle and a second vehicle, and the information providing method comprises, by using processing circuitry of the information providing device:

receiving a piece of video data from the first vehicle, the first vehicle including a dashboard camera, the piece of video data having been captured by the dashboard camera when the first vehicle passed a location corresponding to an occurrence site of a traffic event requiring cautious driving, the occurrence site being identified based on traffic event information received from a traffic information center;

extracting a piece of image data depicting a situation at the occurrence site from the piece of video data;

storing the extracted piece of image data in storage circuitry of the information providing device; and transmitting the stored piece of image data to the second vehicle, the second vehicle including a display device, wherein there is a possibility that the second vehicle will pass the occurrence site after the first vehicle does, and the display device dis plays an image related to the piece of image data when the second vehicle reaches a predetermined notification location located a specified distance before the occurrence site in order to issue an alert;

receiving traffic event information, including a type and a location of a traffic event, from the traffic information center;

correlating the received piece of video data with the location of the traffic event; and when extracting the piece of image data, selecting an image frame from the video data that both corresponds to the location of the traffic event and satisfies at least one image quality condition, the image quality condition including a degree of visibility of a road sign, an obstacle, or a construction indicator in the image frame.

* * * * *